(12) United States Patent
Kwak

(10) Patent No.: US 8,817,217 B2
(45) Date of Patent: Aug. 26, 2014

(54) DISPLAY SUBSTRATE AND METHOD FOR MANUFACTURING THE SAME

(75) Inventor: Yun-Hee Kwak, Seoul (KR)

(73) Assignee: Samsung Display Co., Ltd (KR)

( * ) Notice: Subject to any disclaimer, the term of this patent is extended or adjusted under 35 U.S.C. 154(b) by 210 days.

(21) Appl. No.: 13/276,088

(22) Filed: Oct. 18, 2011

(65) Prior Publication Data

US 2012/0153310 A1 Jun. 21, 2012

(30) Foreign Application Priority Data

Dec. 15, 2010 (KR) .......................... 10-2010-0128102

(51) Int. Cl.
*G02F 1/1345* (2006.01)
*G02F 1/1343* (2006.01)
*G02F 1/1362* (2006.01)

(52) U.S. Cl.
CPC ............... *G02F 1/134363* (2013.01); *G02F 2001/136254* (2013.01); *G02F 1/1345* (2013.01); *G02F 1/13458* (2013.01)
USPC ........................................... 349/149; 349/187

(58) Field of Classification Search
CPC .......... G02F 1/134363; G02F 1/13458; G02F 1/13452; G02F 1/1309; G02F 2001/136254
USPC ............................................ 349/149, 187, 192
See application file for complete search history.

(56) References Cited

U.S. PATENT DOCUMENTS

| | | | | |
|---|---|---|---|---|
| 2003/0090604 A1* | 5/2003 | Song et al. | ....................... | 349/56 |
| 2004/0125256 A1* | 7/2004 | Park et al. | ....................... | 349/43 |
| 2005/0077517 A1* | 4/2005 | Chang et al. | ..................... | 257/59 |
| 2009/0279011 A1* | 11/2009 | Baek et al. | ....................... | 349/46 |
| 2010/0014030 A1* | 1/2010 | Lin | ................................. | 349/84 |

* cited by examiner

*Primary Examiner* — Michael Caley
(74) *Attorney, Agent, or Firm* — Innovation Counsel LLP

(57) ABSTRACT

A display substrate includes an insulating substrate, a signal line, first and second pixel electrodes, a connection line and an insulating layer. The signal line is disposed on the insulating substrate. The first pixel electrode is electrically connected to the signal line through a switching element. The second pixel electrode overlaps the first pixel electrode. The connection line contacts an end portion of the signal line and extends to an end portion of the insulating substrate. The insulating layer is disposed between the first and second pixel electrodes and covers the connection line. The connection line is protected by the insulating layer, and the reliability of the display substrate is enhanced.

26 Claims, 13 Drawing Sheets

DISPLAY SUBSTRATE AND METHOD FOR MANUFACTURING THE SAME

PRIORITY STATEMENT

This application claims priority under 35 U.S.C.§119 to Korean Patent Application No. 2010-0128102, filed on Dec. 15, 2010 in the Korean Intellectual Property Office (KIPO), the contents of which are herein incorporated by reference in their entirety.

BACKGROUND OF THE INVENTION

1. Field of the Invention

The present invention relates to a display substrate and a method for manufacturing the display substrate. More particularly, the present invention relates to a display substrate having enhanced reliability and a method for manufacturing the display substrate.

2. Description of the Related Art

Generally, a liquid crystal display (LCD) panel includes a display substrate, an opposite substrate facing the display substrate and a liquid crystal layer disposed between the display substrate and the opposite substrate. The display substrate includes a display area and a peripheral area. The display area includes a plurality of lines and a plurality of transistors connected to the lines. The peripheral area includes pads supplying an electric signal to the lines.

In the conventional method for testing LCD panels that utilizes twist nematic (TN) mode, a connection line in a driving chip is formed on the substrate. After the display substrate is tested, the test pattern is disconnected from the display substrate by laser trimming. The testing method requires that the substrate has additional space for forming the test pattern, so that a total resistance is increased, and also requires the step of laser trimming after the test is finished.

Recently, display substrates have been made so that the test pattern is formed on an area opposite to the driving chip to be connected to the display substrate, and the test pattern and the display substrate are separated form each other after testing the display substrate.

However, when the test pattern and the display substrate are separated, an electrode exposed on the cutting line of the display substrate may protrude, or a cross-section of the electrode formed in the display substrate may not be uniform. Therefore, the display substrate and the opposite substrate of the LCD may be shorted from each other.

SUMMARY OF THE INVENTION

A display substrate preventing short defects that may occur between an electrode of the display substrate and an electrode of an opposite substrate in a plane-to-line switching (PLS) mode LCD panel is provided.

A method of manufacturing the display substrate is also provided.

According to one aspect, a display substrate includes an insulating substrate, a signal line, first and second pixel electrodes, a connection line and an insulating layer. The signal line is disposed on the insulating substrate. The first pixel electrode is electrically connected to the signal line through a switching element. The second pixel electrode overlaps the first pixel electrode. The connection line contacts an end portion of the signal line and extends to an end portion of the insulating substrate. The insulating layer is disposed between the first and second pixel electrodes and covers the connection line.

The signal line may include a data line extending along a first direction and being connected to an input terminal of the switching element The connection line may include a data connection line making contact with an end portion of the data line and extending to a first end portion of the insulating substrate.

The signal line may include a gate line crossing a first direction and being connected to a control terminal of the switching element.

The connection line may include a gate sub connection pattern connected to an end portion of the gate line though a contact hole formed through the insulating layer and a gate connection line making contact with the gate sub connection pattern and extending to a second end portion of the insulating substrate.

Each of the first pixel electrode and the data and gate connection lines may include a transparent conductive material.

The first pixel electrode may contact an output terminal of the switching element.

The first pixel electrode may contact an output terminal of the switching element though a contact hole formed through the insulating layer.

In another aspect, in a method of manufacturing a display substrate, a gate line is formed on a display cell area of an insulating substrate and a data test line is formed on a test area of the insulating substrate. A data line crossing the gate line is formed on the display cell area, and a first data connection pattern crossing the data test line is formed on the test area. A first pixel electrode is formed on the display cell area, and a data connection line is formed on the test area. The data connection line connects an end portion of the data line with the first data connection pattern. An insulating layer is formed on the insulating substrate on which the first pixel electrode and the data connection line are formed. A second pixel electrode overlapping the first pixel electrode and second data connection pattern connecting the first data connection pattern and the data test line through a first contact hole are formed. The first contact hole is formed through the insulating layer. The insulating substrate is cut along a cutting line defining the display cell area and the test area.

A first electrostatic dispersion line adjacent to the data test line may be formed.

The data connection line may make direct contact with the first data connection pattern.

An input terminal of a switching element and an output terminal of the switching element may be formed. The input terminal is connected to the data line of the display cell area, and the output terminal is separated from the input terminal and makes direct contact with the first pixel electrode.

An input terminal of a switching element and an output terminal of a switching element may be formed. The input terminal is connected to the data line of the display cell area, and the output terminal is separated from the input terminal and contacts the first pixel electrode through a second contact hole formed through the insulating layer.

A first gate connection pattern may be formed on the test area.

A first sub connection pattern adjacent to the gate line may be formed on the display cell area, and a gate test line crossing the first gate connection pattern and a second sub connection pattern adjacent to the gate test line may be formed on the test area.

A second gate connection pattern electrically connecting the first gate connection pattern with the gate test line through a second contact hole formed through the insulating layer may be formed. A third sub connection pattern electrically connecting the first sub connection pattern with the gate line through a third contact hole formed through the insulating layer may be formed. A fourth sub connection pattern electrically connecting the second sub connection pattern with the first gate connection pattern through a fourth contact hole formed through the insulating layer may be formed.

A pad electrode electrically connected to the data test line may be formed.

An antistatic pattern having a zigzag pattern between the data test line and the pad electrode may be formed.

The data line may be tested by applying a test signal to the pad electrode

The insulating layer is formed on the connection line connecting an end portion of the signal line with the test line of the PLS mode display substrate. Thus, a short that may occur between an electrode of the display substrate and an electrode of the opposite substrate as the result of separating the display cell area from a mother substrate is prevented.

BRIEF DESCRIPTION OF THE DRAWINGS

The above and other features and advantages of the present disclosure will become more apparent by describing example embodiments thereof with reference to the accompanying drawings, in which.

DETAILED DESCRIPTION OF THE INVENTION

Hereinafter, the embodiments will be explained in detail with reference to the accompanying drawings.

Figure 1:
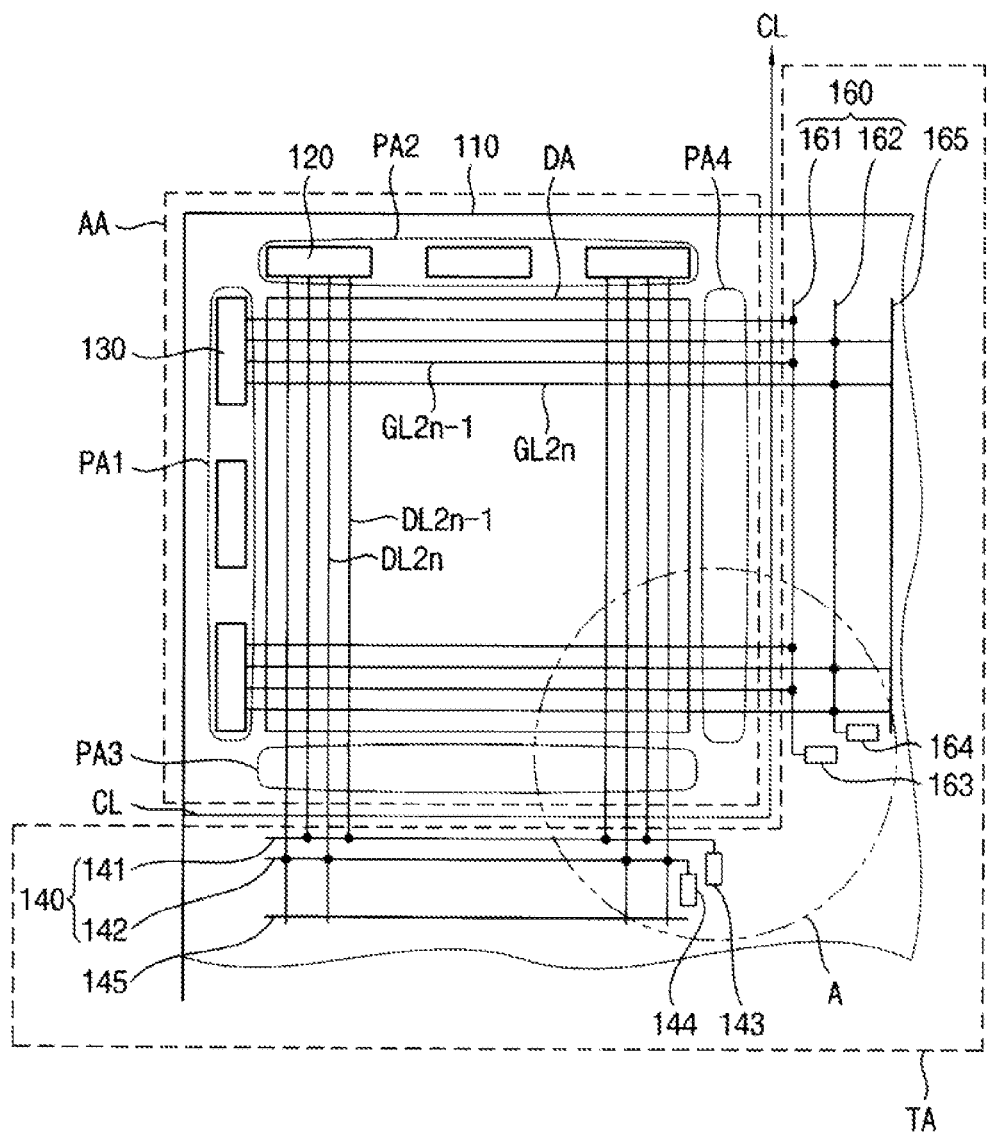
FIG. 1 is a plan view illustrating a mother substrate for a display substrate according to an example embodiment.
Figure 2:
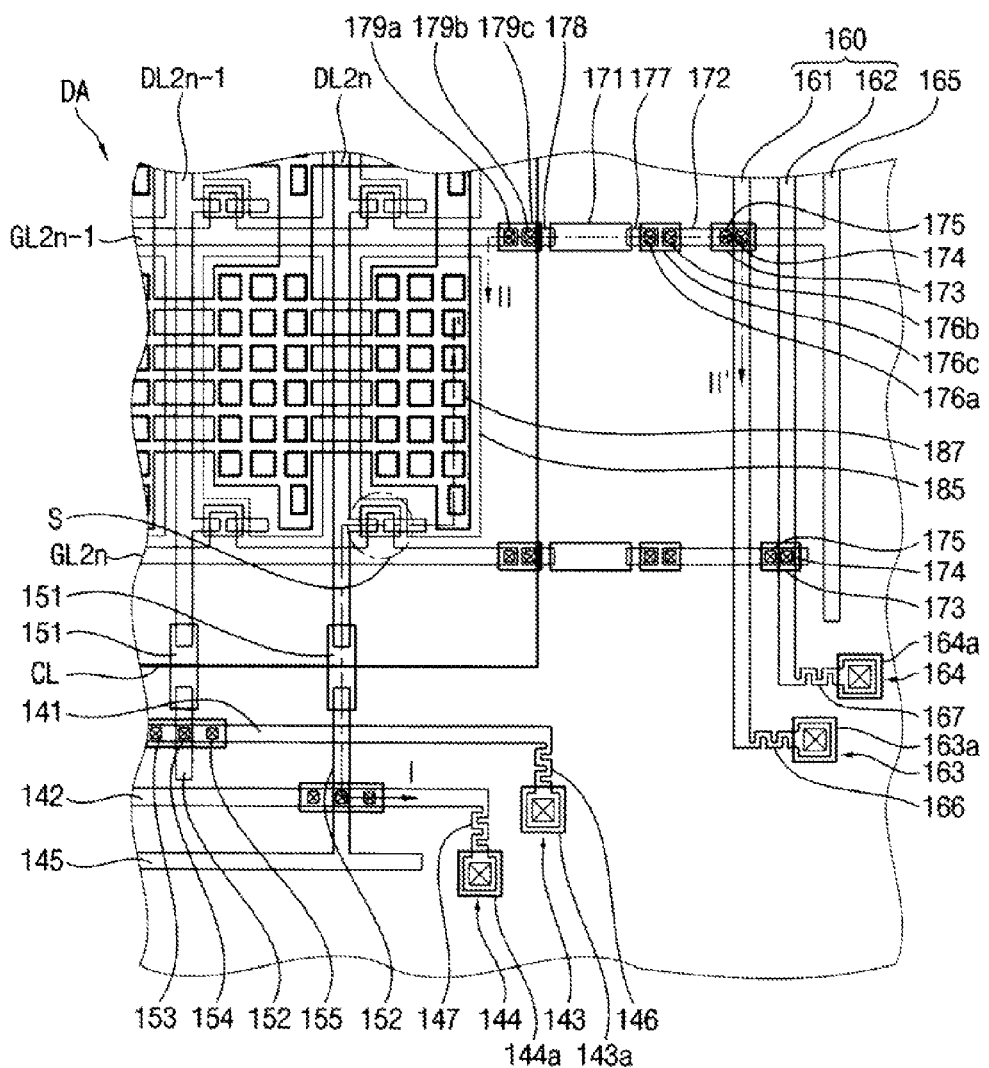
FIG. 2 is an enlarged plan view of A of FIG. 1.

FIG. 1 is a plan view illustrating a mother substrate for a display substrate according to an example embodiment. FIG. 2 is an enlarged plan view of A of FIG. 1.

Referring to FIGS. 1 and 2, a first insulating substrate 110 includes a display cell area AA and a test area TA. Display cell area AA includes a display area DA and first, second, third and fourth peripheral areas PA1, PA2, PA3 and PA4. The display cell area AA and the test area TA are separated from each other along a cutting line CL.

The display area DA includes a plurality of signal lines and a plurality of pixels. The signal lines include a plurality of data lines DL and a plurality of gate lines GL. The gate lines GL may extend along a first direction D1. The data lines DL may extend along a second direction D2 crossing the first direction D1. The pixels are defined by an area where the data lines DL and gate lines GL cross each other and which has a pixel electrode disposed therein. Each of the pixels includes a first pixel electrode 185, a second pixel electrode 187 overlapping the first pixel electrode 185, and a switching elements S.

The first peripheral area PA1 is an area adjacent to an end portion of the gate lines GL. A gate driver sequentially providing a gate signal to the gate lines GL and a plurality of gate pads 130 electrically connected to the gate driver are disposed on the first peripheral area PA1. Alternatively, a gate driver including a plurality of switching elements formed by the same process for forming the switching elements S of the pixel is disposed on the first peripheral area PA1.

The second peripheral area PA2 is an area adjacent to an end portion of the data lines DL. A data pad 120 receiving an image signal provided to the data lines DL is disposed on the second peripheral area PA2.

The third peripheral area PA3 includes a portion of the data connection line 151 and the data line DL extending to the third peripheral area PA3.

The fourth peripheral area PA4 includes a portion of the gate connection line 171 and the gate line DL extending to the fourth peripheral area PA4.

The cutting line CL defines the display cell area AA. In a subsequent process, the mother substrate is cut along the cutting line CL to manufacture the display substrate.

The test area TA includes test lines and test pads. The test area TA is electrically connected to the display cell area AA. For example, the test lines include first and second data test lines 141 and 142 and first and second gate test lines 161 and 162. The test area TA test pads include first and second data test pads 143 and 144 and first and second gate test pads 163 and 164.

The first and second data test lines 141 and 142 are substantially parallel to the gate lines GL. The first and second data test lines 141 and 142 are electrically connected to the data lines DL, and transfer a test signal to the data lines DL to test for defects in the data lines DL. For example, according to a 2D testing method, the data lines DL are divided into first and second groups. The first data test line 141 is electrically connected to the data lines DL of the first group, and the second data test line 142 is electrically connected to the data lines DL of the second group. The first group may be the odd-numbered data lines DL2n-1, and the second group may be the even-numbered data lines DL2n.

Data test pad electrodes 143a and 144a are disposed on the first and second data test pads 143 and 144. The first and second data test pads 143 and 144 are connected to the first and second data test lines 141 and 142, respectively, and receive a test signal for testing for defects in the data lines DL.

The first and second gate test lines 161 and 162 are substantially parallel with the data lines DL. The first and second gate test lines 161 and 162 are electrically connected to the gate lines GL, and transfer a test signal to the gate lines GL to test for defects in the gate lines GL. For example, according to a 2G testing method, the gate lines GL are divided into first and second groups. The first gate test line 161 is electrically connected to the gate lines GL of the first group, and the second gate test line 162 is electrically connected to the gate lines GL of the second group. The first group may be the odd-numbered gate lines GL2n-1, and the second group may be the even-numbered gate lines GL2n.

Gate test pad electrodes 163a and 164a are disposed on the first and second gate test pads 163 and 164. The first and second gate test pads 163 and 164 are connected to the first and second gate test lines 161 and 162, respectively, and receive a test signal for testing for defects in the gate lines GL.

Data and gate electrostatic dispersion lines 145 and 165 may be disposed on the test area TA. The data electrostatic dispersion line 145 is disposed adjacent to the first and second data test lines 141 and 142, and is substantially parallel to the first and second data test lines 141 and 142. The data electrostatic dispersion line 145 is connected to one of the first and second data test lines 141 and 142. The gate electrostatic dispersion line 165 is disposed adjacent to the first and second gate test lines 161 and 162, and is substantially parallel to the first and second gate test lines 161 and 162. The gate electrostatic dispersion line 165 is connected to one of the first and second gate test lines 161 and 162. Thus, the data and gate electrostatic dispersion lines 145 and 165 commonly short the end portions of the gate and data lines GL and DL, respectively. As a result, static input through the data and gate test pads 143, 144, 163 and 164 and the data and gate test lines 141, 142, 161 and 162, and static built up during manufacturing of the display substrate and LCD panel is dispersed. Therefore, the data and gate electrostatic dispersion lines 145 and 165 reduce the amount of static charge that may be introduced into the display cell area AA, so that disconnection of the data and gate lines DL and GL and damage of the pixels are prevented.

Antistatic patterns 146, 147, 166 and 167 are disposed between the data and gate test pad electrodes 143a, 144a, 163a and 164a and the data and gate test lines 141, 142, 161 and 162. The antistatic patterns 146, 147, 166 and 167 reduce static input when the test signals are applied to the data and gate test pad electrodes 143a, 144a, 163a and 164a through a probe, so that disconnection of the data and gate lines DL and GL and damage of the pixels by static are prevented. The antistatic patterns 146, 147, 166 and 167 may have a zigzag shape having a plurality of edges.

The first insulating substrate 110 includes data and gate connection lines 151 and 171 electrically connecting the display cell area AA with the test area TA. The data connection line 151 contacts an end portion of the data line DL. The gate connection line 171 contacts an end portion of the gate line GL. The data and gate connection lines 151 and 171 electrically connect, respectively, the data and gate lines DL and GL with the data and gate test lines 141, 142, 161 and 162.

After testing has been performed, the data and gate connection lines 151 and 171 are cut along the cutting line CL crossing the data and gate connection lines 151 and 171 in a subsequent process.

Figure 3:
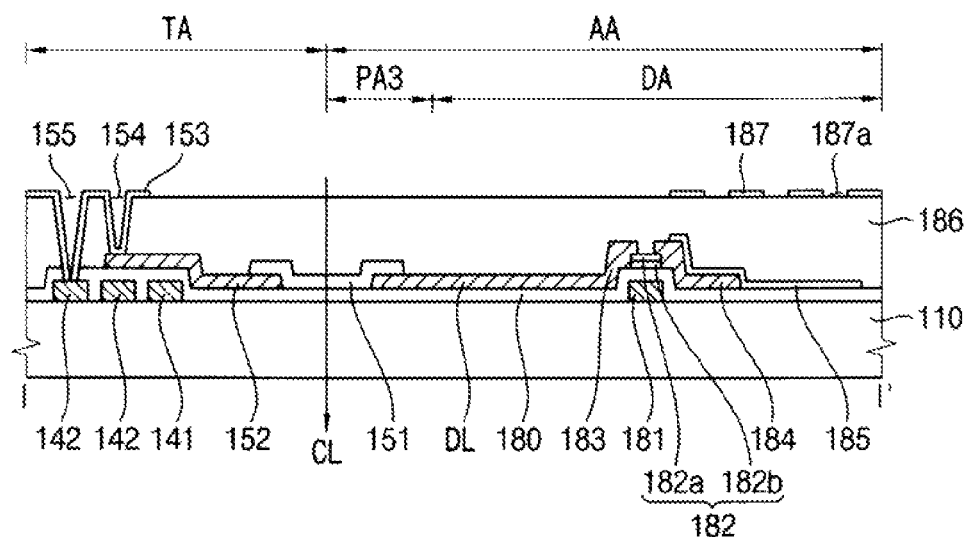
FIG. 3 is a cross-sectional view taken along a line I-I' of FIG. 2.
Figure 4:
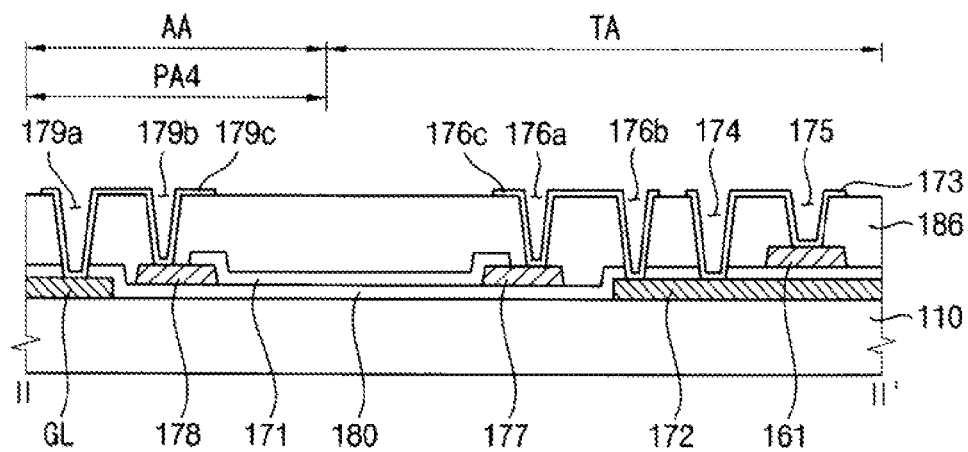
FIG. 4 is a cross-sectional view taken along a line II-II' of FIG. 2.

FIG. 3 is a cross-sectional view taken along a line I-I' of FIG. 2. FIG. 4 is a cross-sectional view taken along a line II-II' of FIG. 2.

Referring to FIGS. 2, 3 and 4, the display area DA includes the switching element S including a gate electrode 181, a semiconductor layer 182, a source electrode 183 and a drain electrode 184, the first pixel electrode 185 and the second pixel electrode 187. Data line DL is connected to source electrode 183, which is an input terminal of the switching element S. The gate line GL is connected to gate electrode 181, which is a control terminal of switching element S. The first pixel electrode 185 makes direct contact with the drain electrode 184, which is the output terminal of the switching element.

The test area TA includes the data and gate test lines 141, 142, 161 and 162, portions of the data and gate connection lines 151 and 171, the data and gate electrostatic dispersion lines 145 and 165, the antistatic patterns 146, 147, 166 and 167 and data and gate connection patterns 152, 153, 172 and 173.

A gate insulating layer 180 is formed on the first insulating substrate 110. The gate insulating layer 180 covers the gate electrode 181, the gate line GL, the first and second data test lines 141 and 142 and the first gate connection pattern 172.

The gate insulating layer 180 may include an insulating material that transmits light. Examples of the insulating material may include silicon nitride, silicon oxide and so on.

The semiconductor layer 182 is formed on the gate insulating layer 180. The semiconductor layer 182 includes, for example, an amorphous silicon pattern 182a and an n+ amorphous silicon pattern 182b. The amorphous silicon pattern 182a is formed on an area corresponding to the gate electrode 181. The n+ amorphous silicon pattern 182b is formed on the amorphous silicon pattern 182a.

The data lines DL, the source electrode 183, the drain electrode 184, the first data connection pattern 152, the gate test lines 161 and 162 and the first and second sub connection patterns 177 and 178 are formed on the gate insulating layer 180.

The source electrode 183 is formed on the n+ amorphous silicon pattern 182b. The source electrode 183 protrudes from the data line DL and is electrically connected to the data line DL.

The drain electrode 184 is formed on the n+ amorphous silicon pattern 182b, and is separated from the source electrode 183. The drain electrode 184 makes direct contact with the first pixel electrode 185 to be electrically connected to the first pixel electrode 185.

The first sub connection pattern 177 is formed on the test area TA. The first sub connection pattern 177 is formed on an area adjacent to the first and second gate test lines 161 and 162.

The second sub connection pattern 178 is formed on the display cell area AA. The second sub connection pattern 178 is formed on an area adjacent to the gate line GL.

The first and second sub connection patterns 177 and 178 make contact with ends of the gate connection line 171.

The first pixel electrode 185 and the data and gate connection lines 151 and 171 are formed on the first insulating substrate 110 on which the semiconductor layer 182 is formed.

The first pixel electrode 185 makes direct contact with the drain electrode 184. The first pixel electrode 185 may include a transparent conductive oxide material. Examples of the transparent conductive oxide material may include indium tin oxide (ITO), indium zinc oxide (IZO) and so on.

The data connection line 151 is formed on the third peripheral area PA3 and the test area TA and may extend in a direction (e.g., D2) that crosses the direction in which the first and second data test lines 141 and 142 extend (e.g. D1). One end portion of the data connection line 151 makes direct contact with the data line DL, and another end portion of the data connection line 151 makes direct contact with the first data connection pattern 152. Thus, the display cell area AA is electrically connected with the test area TA.

The gate connection line 171 is formed on the fourth peripheral area PA4 and the test area TA and may extend in a direction (e.g. D1) that crosses the direction in which the first and second gate test lines 161 and 162 extend (e.g. D2). One end portion of the gate connection line 171 makes direct contact with the first sub connection pattern 177, and another end portion of the gate connection line 171 makes direct contact with the second sub connection pattern 178. Thus, the display cell area AA is electrically connected to the test area TA.

The data and gate connection lines 151 and 171 may include a transparent conductive oxide material. Examples of the transparent conductive oxide material may include indium tin oxide (ITO), indium zinc oxide (IZO) and so on.

An insulating layer 186 may be formed on the first insulating substrate 110. The insulating layer 186 covers the first pixel electrode 185, the switching element S, the data lines DL, the data and gate connection lines 151 and 171, the first data connection pattern 152 and the first and second gate test lines 161 and 162 and first and second data test lines 141 and 142. The insulating layer 186 may include an insulating material that transmits light. Examples of the insulating material may include silicon nitride, silicon oxide and so on.

The insulating layer 186 may have first contact holes 154 and 174 and second contact holes 155 and 175. The first contact holes 154 and 174 expose a portion of the first data connection pattern 152 and the first gate connection pattern 172. The second contact holes 155 and 175 respectively expose a portion of the data and gate test lines 141, 142, 161 and 162. In addition, the insulating layer 186 may have a third contact hole 176a, a fourth contact hole 179a, a fifth contact hole 179b and a sub contact hole 176b. The third contact hole 176a exposes the first sub connection pattern 177. The fourth contact hole 179a exposes the gate line GL. The fifth contact hole 179b exposes the second sub connection pattern 178. The sub contact hole 176b further exposes the first gate connection pattern 172.

The second pixel electrode 187, the second data connection pattern 153 and the second gate connection pattern 173, the third and fourth sub connection patterns 176c and 179c and the data and gate test pad electrodes 143a, 144a, 163a and 164a are formed on the insulating layer 186.

The second pixel electrode 187 is formed on an area overlapping the first pixel electrode 185, and has a plurality of openings 187a. The second pixel electrode 187 may include a transparent conductive oxide material. Examples of the transparent conductive oxide material may include indium tin oxide (ITO), indium zinc oxide (IZO) and so on.

The second data connection pattern 153 and the second gate connection pattern 173 may include a material substantially the same as the second pixel electrode 187. The second data connection pattern 153 and the second gate connection pattern 173 are electrically connected to the first data connection pattern 152 and the first gate connection pattern 172 through the first contact holes 154 and 174, respectively. The second data connection pattern 153 and the second gate connection pattern 173 are electrically connected to the data and gate test lines 141, 142, 161 and 162 through the second contact holes 155 and 175, respectively.

The third sub connection pattern 176c is electrically connected to the first sub connection pattern 177 through the third contact hole 176a and is electrically connected to the first gate connection pattern 172 through the sub contact hole 176b. Alternatively, the third sub connection pattern 176c and the second gate connection pattern 173 may be integrally formed to omit the third sub connection pattern 176c and the sub contact hole 176b to electrically connect the display cell area AA with the test area TA.

The fourth sub connection pattern 179c is electrically connected to the second sub connection pattern 178 through the fifth contact hole 179b, and is electrically connected to the gate line GL through the fourth contact hole 179a.

The data and gate test pad electrodes 143a, 144a, 163a and 164a are formed an area corresponding to the test pads 143, 144, 163 and 164.

The PLS mode LCD panel includes first and second pixel electrodes 185 and 187, which are formed on a display substrate, for forming an electric filed applied to a liquid crystal. Thus, short defects that may occur in an LCD between an electrode of the display substrate and an electrode of an opposite substrate are prevented by having the pixel electrodes both on the same substrate.

According to the present example embodiment, a connection line, such as data and gate connection lines 151 and 171, is covered by an insulating layer, so that the connection line does not protrude from a cutting section cut along the cutting line crossing the connection line after testing the display substrate, and is not exposed on the cutting section. The connection line makes direct contact with a connection pattern, such as first data connection pattern 152 and first and second sub connection patters 177 and 178, so that a contact portion of the connection line and the connection pattern is not opened after separating the test area from the display cell area.

In addition, the connection line may include a transparent conductive oxide material. Thus, corrosion of the connection line at the cutting section after separating the test area from the display cell area is prevented.

Figure 5:
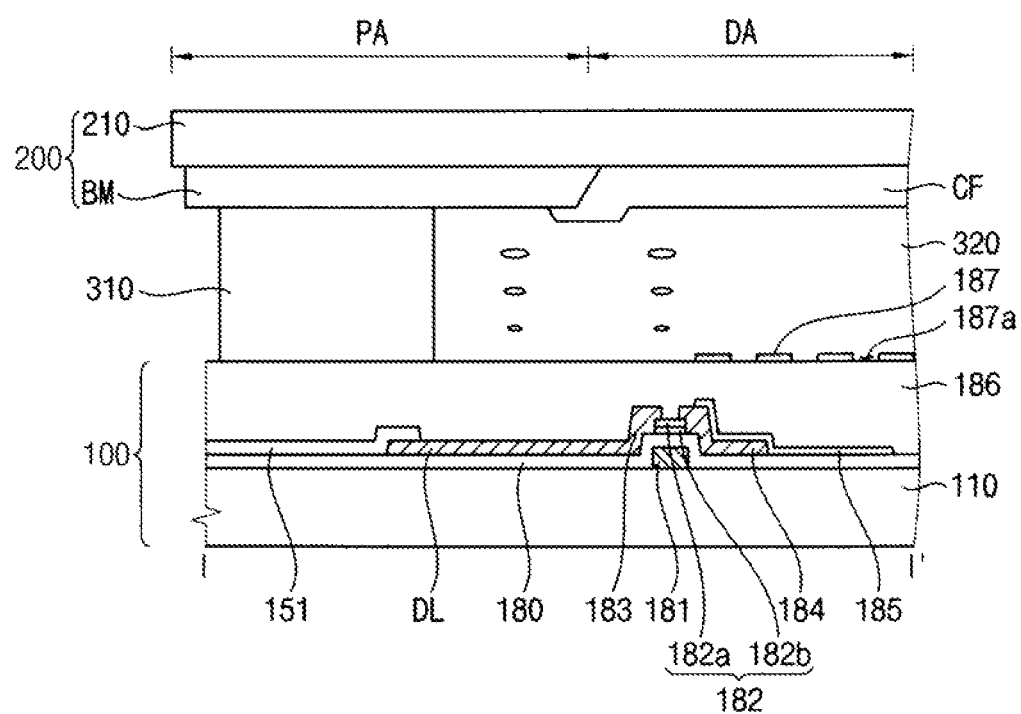
FIG. 5 is a cross-sectional view illustrating a liquid crystal display (LCD) panel including the display substrate of FIG. 1.

FIG. 5 is a cross-sectional view illustrating an LCD panel including the display substrate of FIG. 1.

Referring to FIGS. 3, 4 and 5, an LCD panel includes an opposite substrate 200 including a second insulating substrate 210, a light shielding layer BM and a color filter CF, the display substrate 100 separated from the test area TA along cutting line CL, and a liquid crystal layer 320 disposed between the display substrate 100 and the opposite substrate 200. The seal member 310 may be formed on the connection lines 151 and 171.

Figure 6A:
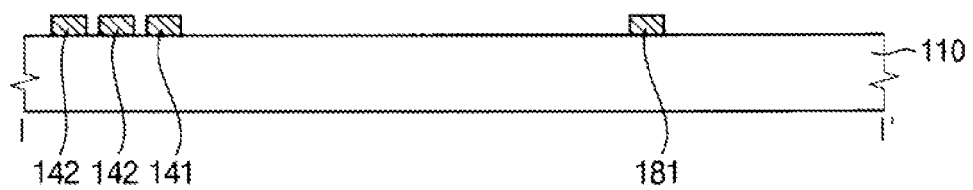
FIGS. 6A and 6G are cross-sectional views for explaining a manufacturing process for the display substrate of FIG. 1.
Figure 6B:
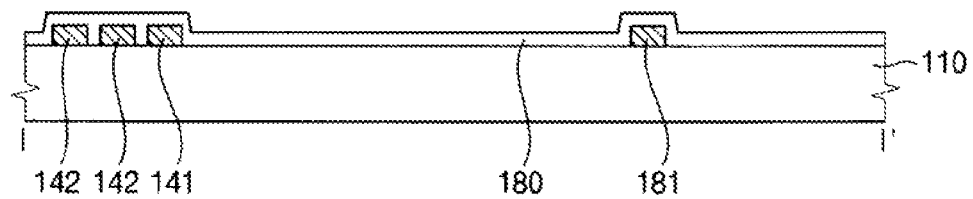
Figure 6C:
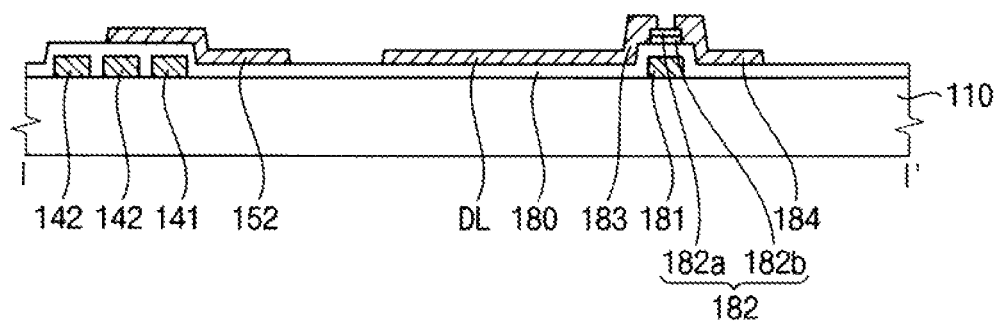
Figure 6D:
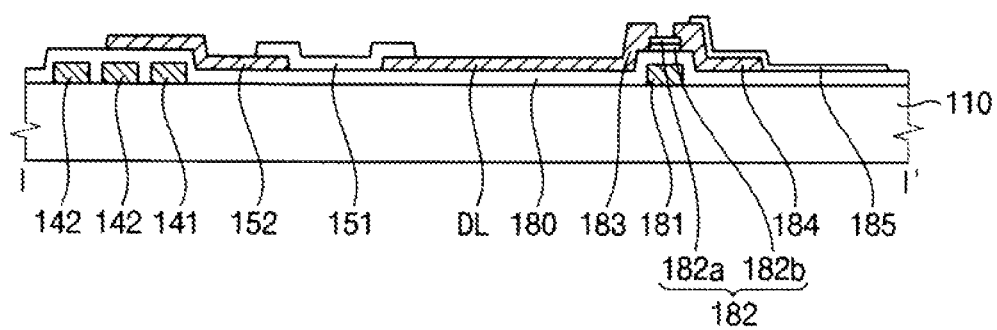
Figure 6E:
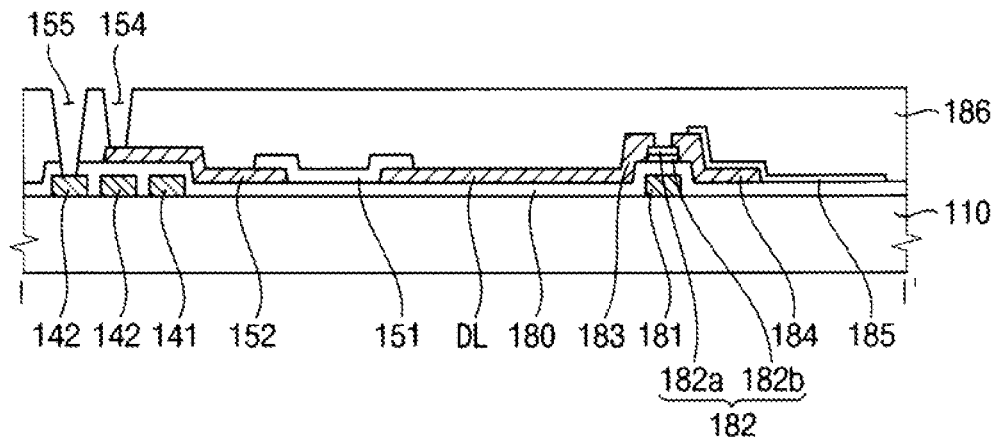
Figure 6F:
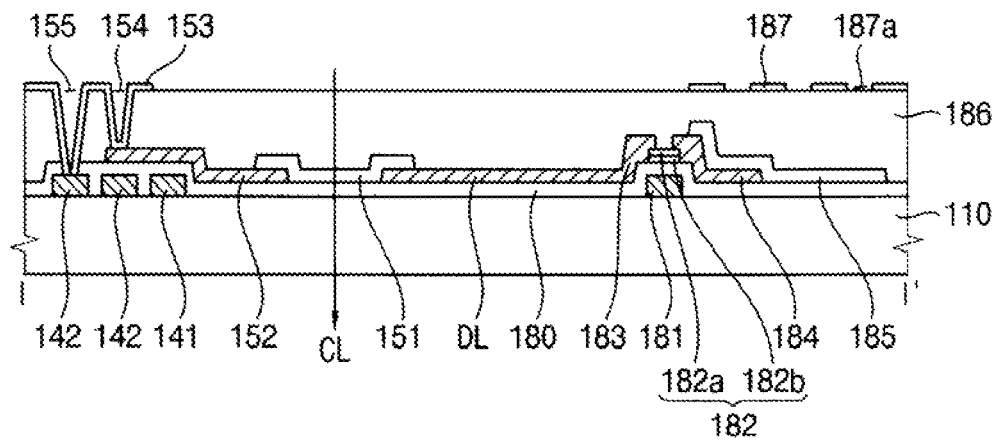
Figure 6G:
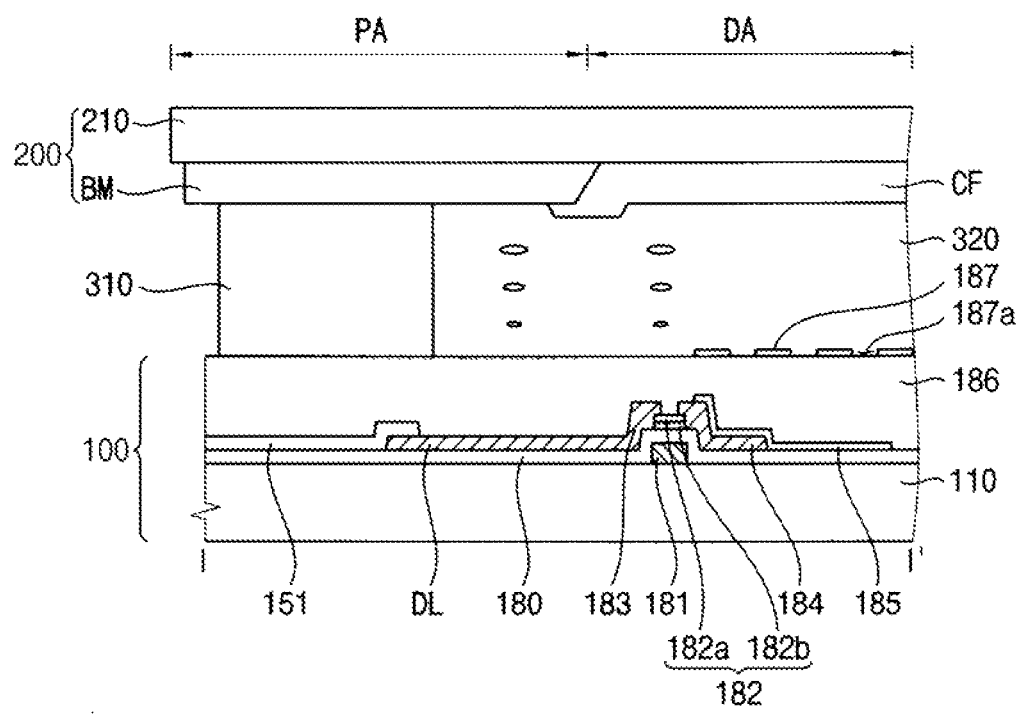

FIGS. 6A and 6G are cross-sectional views for explaining a manufacturing process for the display substrate of FIG. 1.

Referring to FIGS. 3, 4 and 6A, a gate metal layer (not shown) is formed on the first insulating substrate 110. Examples of a material that may be used for the gate metal layer may include chromium, aluminum, tantalum, molybdenum, titanium, tungsten, copper, silver and alloys of these metals. The gate metal layer is deposited by a sputtering method. The gate metal layer may be a monolayer or a multilayer.

Thereafter, the gate metal layer is patterned by a photo etching process to form the gate electrode 181, the gate line GL, the first and second data test lines 141 and 142, the first and second data test pads 143 and 144 and the first gate connection pattern 172. In addition, the gate metal layer may be patterned by the photo etching process to further form the data antistatic patterns 146 and 147 formed between, respectively, the first and second data test lines 141 and 142 and the first and second data test pads 143 and 144. The data electrostatic dispersion line 145 may also be formed.

The gate electrode 181 and the gate line GL are formed on the display cell area AA of the first insulating substrate 110. The first and second data test lines 141 and 142, the first and second data test pads 143 and 144, the first gate connection pattern 172, the data antistatic patterns 146 and 147 and the electrostatic dispersion lines 145 are formed on the test area TA of the first insulating substrate 110. The gate line GL and the first and second data test lines 141 and 142 extend along the first direction D1.

Referring to FIGS. 3, 4 and 6B, the gate insulating layer 180 is formed on the first insulating substrate 110 on which the gate electrode 181, the gate line GL, the first and second data test lines 141 and 142, the first and second data test pads 143 and 144 and the first gate connection pattern 172 are formed.

The gate insulating layer 180 may include an insulating material that transmits light. Examples of the insulating material may include silicon nitride, silicon oxide and so on.

The gate insulating layer 180 may be formed by a plasma enhanced chemical vapor deposition (PECVD) method. In addition, the gate insulating layer 180 may have a doublelayered structure having two layers formed from different materials and formed by different processes.

Referring to FIGS. 3, 4 and 6C, a primitive amorphous silicon layer (not shown) is formed on the first insulating substrate 110 on which the gate insulating layer 180 is formed. Thereafter, n+ ions are implanted into an upper portion of the primitive amorphous silicon layer to form the semiconductor layer 182 including the amorphous silicon pattern 182a and the n+ amorphous silicon pattern 182b. The amorphous silicon pattern 182a is formed on an area corresponding to the gate electrode 181. The n+ amorphous silicon pattern 182b is formed on the amorphous silicon pattern 182a.

Thereafter, a data metal layer (not shown) is formed on the first insulating substrate 110 on which the semiconductor layer 182 is formed. Examples of a material that may be used for the data metal layer may include chromium, aluminum, tantalum, molybdenum, titanium, tungsten, copper, silver and alloys of these metals. The data metal layer is deposited by a sputtering method.

Thereafter, the data metal layer is patterned by a photo etching process to form the data line DL, the source and drain electrodes 183 and 184, the first data connection pattern 152, the first and second gate test lines 161 and 162, the first and second gate test pads 163 and 164 and the first and second sub connection patterns 177 and 178. In addition, the data metal layer may be patterned by the photo etching process to further form the gate antistatic patterns 166 and 167 between the first and second gate test lines 161 and 162 and the first and second gate test pads 163 and 164. The gate electrostatic dispersion line 165 may also be formed.

The data lines DL, the source and drain electrodes 183 and 184 and the second sub connection pattern 178 are formed on the display cell area AA of the first insulating substrate 110. The data lines DL extends along the second direction D2, and the source and drain electrodes 183 and 184 are formed in the pixel. The second sub connection pattern 178 is formed on an area adjacent to the gate line GL.

The first data connection pattern 152, the first and second gate test lines 161 and 162, the first sub connection pattern 177, and the gate antistatic patterns 166 and 167 are formed on the test area TA.

Referring to FIGS. 3, 4 and 6D, a first transparent electrode layer (not shown) is formed on the first insulating substrate 110. The first transparent electrode layer may include a transparent conductive oxide material. Examples of the transparent conductive oxide material may include indium tin oxide (ITO), indium zinc oxide (IZO) and so on. The first transparent electrode layer may be deposited by a sputtering method.

Thereafter, the first transparent electrode layer is patterned by the photo etching process to form the first pixel electrode 185 and the data and gate connection lines 151 and 171.

The first pixel electrode 185 is formed in the pixel, and makes direct contact with the drain electrode 184.

One end portion of the data connection line 151 makes direct contact with the data line DL, and another end portion of the data connection line 151 makes direct contact with the first data connection pattern 152. One end portion of the gate connection line 171 makes direct contact with the first sub connection pattern 177, and another end portion of the gate connection line 171 makes direct contact with the second sub connection pattern 178.

Referring to FIGS. 3, 4 and 6E, the insulating layer 186 may be formed on the first insulating substrate 110. The insulating layer 186 covers the first pixel electrode 185, the switching element S, the data lines DL, the data and gate connection lines 151 and 171, the first data connection pattern 152 and the first and second gate test lines 161 and 162 and first and second data test lines 141 and 142. The insulating layer 186 may include an insulating material that transmits light. Examples of the insulating material may include silicon nitride, silicon oxide and so on. The insulating layer 186 may be formed by a PECVD method.

Thereafter, the insulating layer 186 is patterned by the photo etching process to form the first contact holes 154 and 174 and the second contact holes 155 and 175. The first contact holes 154 and 174 respectively expose a portion of the first data connection pattern 152 and the first gate connection pattern 172. The second contact holes 155 and 175 expose a portion of the data and gate test lines 141, 142, 161 and 162. In addition, the insulating layer 186 is patterned by the photo etching process to form the third contact hole 176a, the fourth contact hole 179a, the fifth contact hole 179b and the sub contact hole 176b. The third contact hole 176a exposes the first sub connection pattern 177. The fourth contact hole 179a exposes the gate line GL. The fifth contact hole 179b exposes the second sub connection pattern 178. The sub contact hole 176b further exposes the first gate connection pattern 172.

Referring to FIGS. 3, 4 and 6F, a second transparent electrode layer (not shown) is formed on the insulating layer 186. The second transparent electrode layer may include a transparent conductive oxide material. Examples of the transparent conductive oxide material may include indium tin oxide (ITO), indium zinc oxide (IZO) and so on. The first transparent electrode layer may be deposited by a sputtering method.

Thereafter, the second transparent electrode layer is patterned by a photo etching process to form the second pixel electrode 187, the second connection patterns 153 and 173 and the third and fourth sub connection patterns 176c and 179c.

The second pixel electrode 187 overlaps the first pixel electrode 185. The second pixel electrode 187 has openings 187a.

The second data connection pattern 153 and the second gate connection pattern 173 are electrically connected to the first data connection pattern 152 and the first gate connection pattern 172 through the first contact holes 154 and 174, respectively. The second data connection pattern 153 and the second gate connection pattern 173 are electrically connected to the data and gate test lines 141, 142, 161 and 162 through the second contact holes 155 and 175, respectively.

The third sub connection pattern 176c contacts the first sub connection pattern 177 through the third contact hole 176a, and contacts the first gate connection pattern 172 through the sub contact hole 176b. Alternatively, the third sub connection pattern 176c and the second gate connection pattern 173 may be integrally formed to omit the third sub connection pattern 176c and the sub contact hole 176b.

The fourth sub connection pattern 179c contacts the second sub connection pattern 178 through the fifth contact hole 179b and contacts the gate line GL through the fourth contact hole 179a.

Referring to FIGS. 3, 4 and 6G, after the second transparent electrode layer is patterned, a test signal is applied to the data and gate test pad electrodes 143a, 144a, 163a and 164a to determine whether the data and gate lines DL and GL have a defect. After testing the data and gate lines DL and GL, the opposite substrate 200 including the color filter CF and the light shielding layer BM is assembled with the display substrate 100. The liquid crystal material 320 is provided between the display substrate 100 and the opposite substrate 200. The sealing member 310 is used to seal between the display substrate 100 and the opposite substrate 200. The sealing member 310 may be formed in an area corresponding to the data and gate connection lines 151 and 171.

After a sealing process is performed by the sealing member 310, the mother substrate is cut along the cutting line CL that crosses the data and gate connection lines 151 and 171 to separate the display cell area AA from the test area TA.

According to the present example embodiment, the LCD panel, which is of the PLS mode and includes the display substrate having both the first pixel electrode and the second pixel electrode is manufactured. Because the test area is formed on the mother substrate and the display substrate is tested on the test area, the reliability of the display substrate is enhanced. In addition, a connection line is covered by an insulating layer, so that the connection line does not protrude from a cutting section that is cut along the cutting line that crosses the connection line after testing the display substrate, and is not exposed on the cutting section.

The display substrate may be formed by other processes, and is not limited to the method of FIGS. 6A to 6G.

Figure 7:
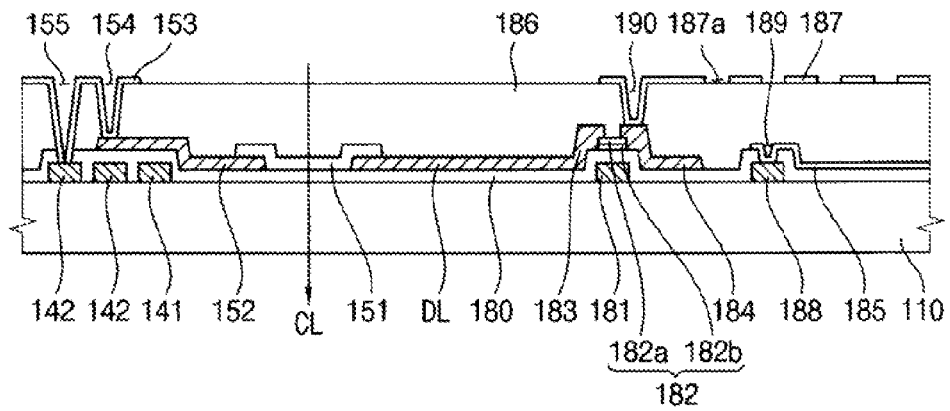
FIG. 7 is a cross-sectional view illustrating a mother substrate for a display substrate according to another example embodiment.

FIG. 7 is a cross-sectional view illustrating a mother substrate for a display substrate according to another example embodiment.

A display substrate according to the present example embodiment is substantially the same as the display substrate 100 according to the previous example embodiment described referring to FIGS. 1 to 5 except for a first pixel electrode 185, a second pixel electrode 187 and a cross sectional view of an area where the first pixel electrode 185 and the second pixel electrode 187 are formed, so the same reference numerals will be used to refer to the same or like parts as those described in the previous example embodiment, and thus any repetitive explanation concerning the above elements will be omitted or only briefly described.

Referring to FIGS. 1, 4 and 7, a mother substrate includes a display cell area AA and a test area TA. The display cell area AA includes a display area DA and first, second, third and fourth peripheral areas PA1, PA2, PA3 and PA4. The display cell area AA and the test area TA are separated from each other along a cutting line CL.

The display area DA includes data lines DL, gate lines GL, a plurality of pixels and a common voltage line 188. The gate lines GL may extend along a first direction D1. The data lines DL may extend along a second direction D2 that crosses the first direction D1.

Each of the pixels include a first pixel electrode 185, a second pixel electrode 187 that overlaps the first pixel electrode 185 and a switching elements S that includes a gate electrode 181, a semiconductor layer 182, and source and drain electrodes 183 and 184.

The common voltage line 188 applies a common voltage to the first pixel electrode 185. The common voltage line 188 is formed from a layer that is substantially the same layer as the gate electrode 181. The first pixel electrode 185 contacts the common voltage line 188 through a sixth contact hole 189. The sixth contact hole 189 is formed through the gate insulating layer 180 covering the gate electrode 181.

The second pixel electrode 187 contacts the drain electrode 184, which is the output terminal of switching element S, through a seventh contact hole 190. The seventh contact hole 190 is formed through the insulating layer 186 covering the first pixel electrode 185 and the data and gate connection lines 151 and 171.

The first peripheral area PA1 is an area adjacent to an end portion of the gate lines GL. A gate driver sequentially providing a gate signal to the gate lines GL and a plurality of gate pads 130 electrically connected to the gate driver are disposed on the first peripheral area PA1. The second peripheral area PA2 is an area adjacent to an end portion of the data lines DL. A data pad 120 receiving an image signal provided to the data lines DL is disposed on the second peripheral area PA2.

The test area TA includes test lines and test pads. The test area TA is electrically connected to the gate and data lines DL and GL of the display cell area AA. First and second data test lines 141 and 142, first and second gate test lines 161 and 162, first and second data connection patterns 152 and 153, first and second data test pads 143 and 144, first and second gate test pads 163 and 164 and data and gate test pad electrodes 143a, 144a, 163a and 164a are disposed on the test area TA. First and third sub connection patterns 177 and 176c are disposed on an area adjacent to the gate test lines 161 and 162 of the test area TA. The third sub connection pattern 176c and the second gate connection pattern 173 may be integrally formed to omit the third sub connection pattern 176c.

The data connection line 151, which may include a material that is substantially the same as the first pixel electrode 185, contacts an end portion of the data line DL and an end portion of the first data connection pattern 152 to electrically connect the display cell area AA with the test area TA.

The gate connection line 171, which may include a material substantially the same as the first pixel electrode 185, makes direct contact with an end portion of the first sub connection pattern 177 and an end portion of the second sub connection pattern 178 to electrically connect the display cell area AA with the test area TA.

The test area TA may include data and gate electrostatic dispersion lines 145 and 165 and antistatic patterns 146, 147, 166 and 167. Static introduced into the display substrate during manufacturing of the display substrate and an LCD panel, and also static from the testing process is dispersed by the data and gate electrostatic dispersion lines 145 and 165 and the antistatic patterns 146, 147, 166 and 167. As a result, disconnection of the data and gate lines DL and GL and damage of the pixels is prevented.

According to the present example embodiment, the first pixel electrode is formed under the insulating layer, and receives the common voltage through the common voltage line (e.g., 188) formed on a first insulating layer. In addition, the second pixel electrode formed on the insulating layer is electrically connected to the drain electrode of the switching element, and receives a pixel voltage.

Figure 8:
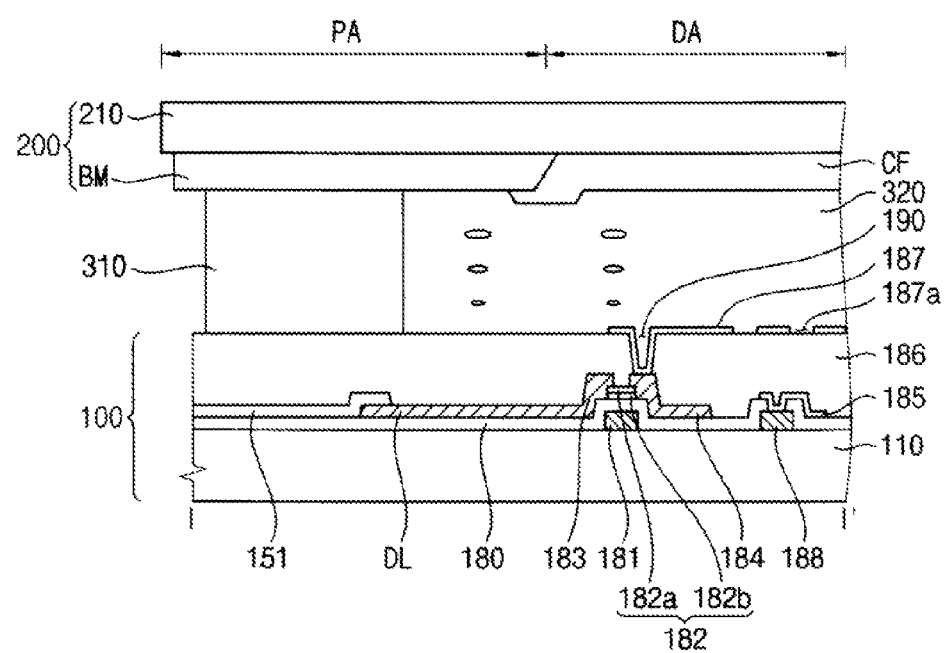
FIG. 8 is a cross-sectional view illustrating an LCD panel including the display substrate of FIG. 7.

FIG. 8 is a cross-sectional view illustrating an LCD panel including the display substrate of FIG. 7.

Referring to FIGS. 7 and 8, an LCD panel includes an opposite substrate 200 including a second insulating substrate 210, a light shielding layer BM and a color filter CF, a display substrate 100 separated from the test area TA and a liquid crystal layer 320 disposed between the display substrate 100 and the opposite substrate 200. The seal member 310 may be formed on the connection lines 151 and 171.

Figure 9A:
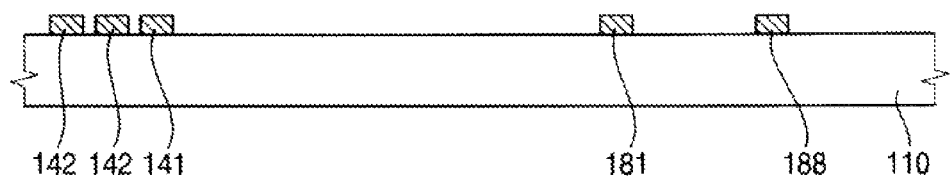
FIGS. 9A and 9G are cross-sectional views for explaining a manufacturing process for the display substrate of FIG. 7.
Figure 9B:
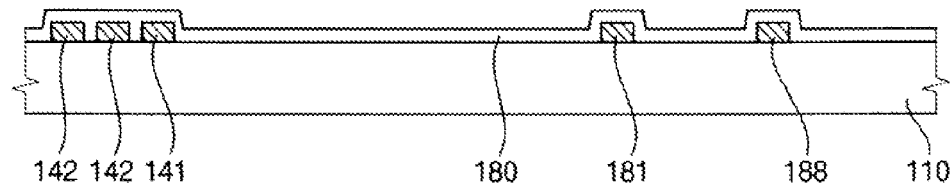
Figure 9C:
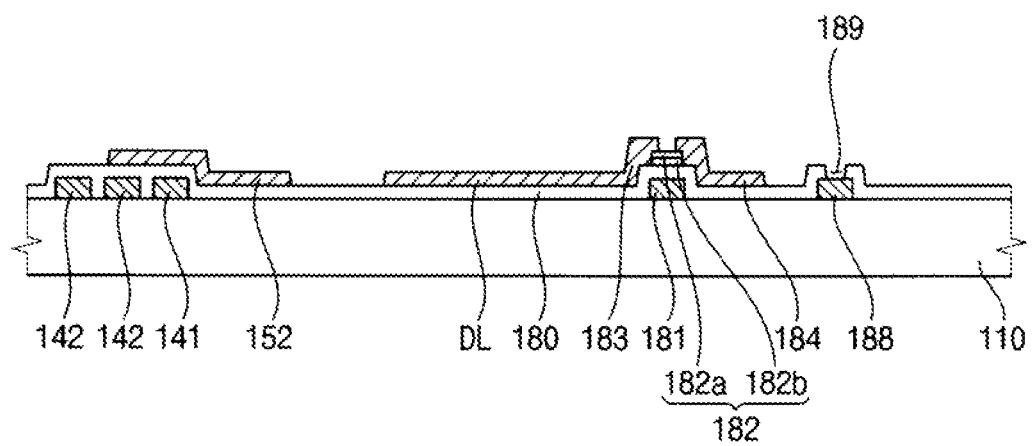
Figure 9D:
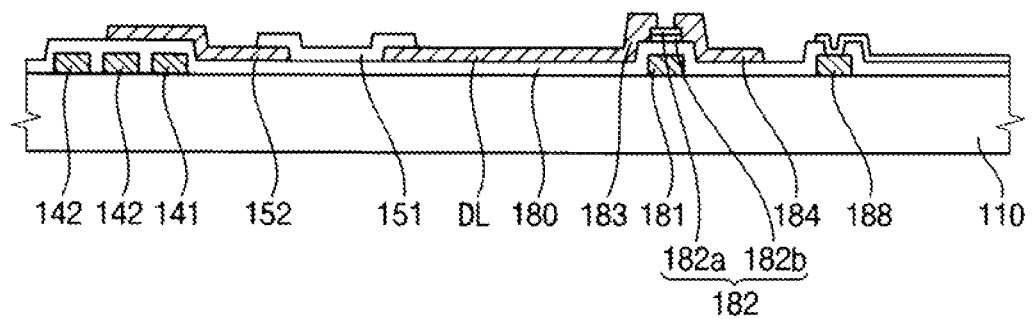
Figure 9E:
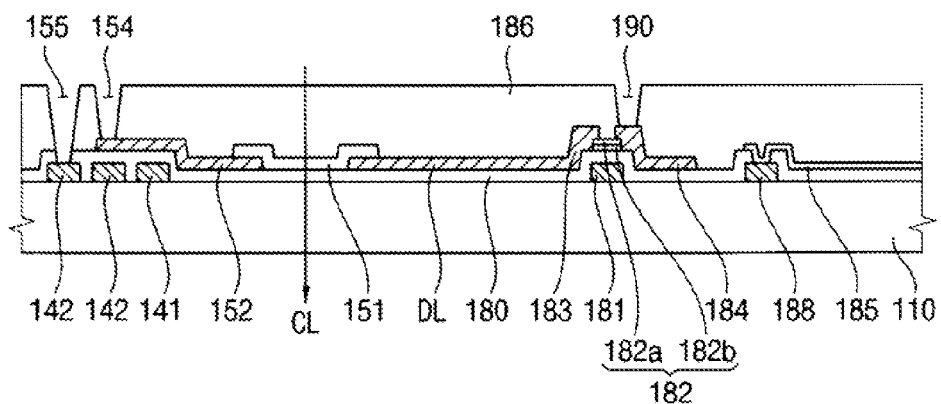
Figure 9F:
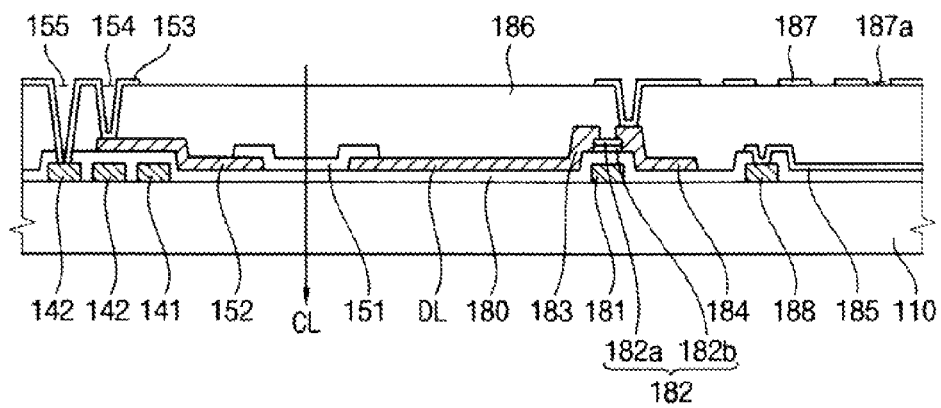
Figure 9G:
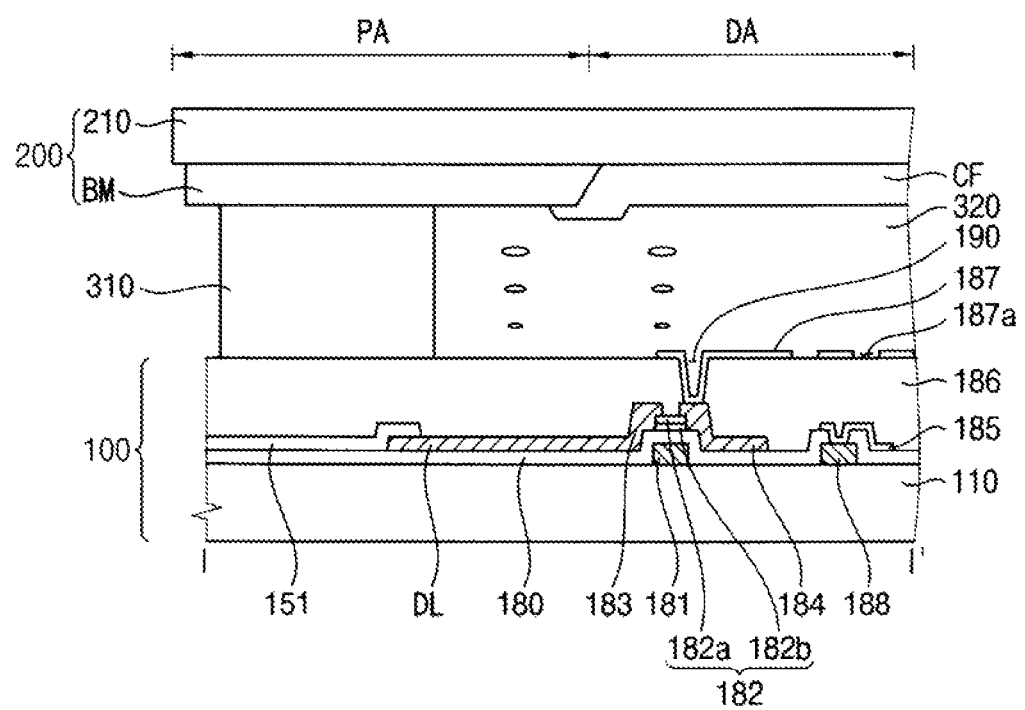

FIGS. 9A and 9G are cross-sectional views for explaining a manufacturing process for the display substrate of FIG. 7.

A manufacturing process for the display substrate according to the present example embodiment is substantially the same as the manufacturing process for the display substrate 100 according to the previous example embodiment described referring to FIGS. 6A to 6G except for a first pixel electrode 185 and a second pixel electrode 187, so the same reference numerals will be used to refer to the same or like parts as those described in the previous example embodiment and thus any repetitive explanation concerning the above elements will be omitted or only briefly described.

Referring to FIGS. 4, 7 and 9A, a gate metal layer (not shown) is formed on a first insulating substrate 110. Thereafter, the gate metal layer is patterned by a photo etching process to form the gate electrode 181, the gate line GL, the first and second data test lines 141 and 142, the first and second data test pads 143 and 144, the first gate connection pattern 172 and the common voltage line 188. In addition, the gate metal layer may be patterned by the photo etching process to further form the data antistatic patterns 146 and 147 formed between the first and second data test lines 141 and 142 and the first and second data test pads 143 and 144. The data electrostatic dispersion line 145 may also be formed.

Referring to FIGS. 4, 7 and 9B, a gate insulating layer 180 is formed on the first insulating substrate 110. The gate insulating layer 180 may include an insulating material that transmits light. Examples of the insulating material may include silicon nitride, silicon oxide and so on.

Referring to FIGS. 4, 7 and 9C, a primitive amorphous silicon layer (not shown) is formed on the first insulating substrate 110 on which the gate insulating layer 180 is formed. Thereafter, n+ ions are implanted into an upper portion of the primitive amorphous silicon layer to form a semiconductor layer 182 including an amorphous silicon pattern 182a and an n+ amorphous silicon pattern 182b.

Thereafter, a data metal layer (not shown) is formed on the first insulating substrate 110 on which the semiconductor layer 182 is formed. Thereafter, a portion of the data metal layer is etched by the photo etching process to form the data line DL, the source and drain electrodes 183 and 184, the first data connection pattern 152, the first and second gate test lines 161 and 162, the first and second gate test pads 163 and 164 and the first and second sub connection patterns 177 and 178. In addition, a portion of the data metal layer may be etched by the photo etching process to further form the gate antistatic patterns 166 and 167 formed between the first and second gate test lines 161 and 162 and the first and second gate test pads 163 and 164. The gate electrostatic dispersion line 165 may also be formed.

Thereafter, the sixth contact hole 189 that exposes the common voltage line 188 is formed through the gate insulating layer 180.

Referring to FIGS. 4, 7 and 9D, a first transparent electrode layer (not shown) is formed on the first insulating substrate 110. The first transparent electrode layer may include a transparent conductive oxide material. Thereafter, the first transparent electrode layer is patterned by the photo etching process to form the first pixel electrode 185 and the data and gate connection lines 151 and 171. The first pixel electrode 185 contacts the common voltage line 188 through the sixth contact hole 189.

Referring to FIGS. 4, 7 and 9E, the insulating layer 186 may be formed on the first insulating substrate 110. The insulating layer 186 covers the first pixel electrode 185, the switching element S, the data lines DL, and the data and gate connection lines 151 and 171. The insulating layer 186 may be formed by a PECVD method.

Thereafter, the insulating layer 186 is etched by the photo etching process to form the first contact holes 154 and 174, the second contact holes 155 and 175, the third contact hole 176a, the fourth contact hole 179a, the fifth contact hole 179b and the seventh contact hole 190. The first contact holes 154 and 174 expose a portion of the first data connection pattern 152 and the first gate connection pattern 172. The second contact holes 155 and 175 expose a portion of the data and gate test lines 141, 142, 161 and 162. The third contact hole 176a exposes the first sub connection pattern 177. The fourth contact hole 179a exposes the gate line GL. The fifth contact hole 179b exposes the second sub connection pattern 178. The seventh contact hole 190 exposes the drain electrode 184. In addition, the insulating layer 186 is etched by the photo etching process to form a sub contact hole 176b exposing the first gate connection pattern 172.

Referring to FIGS. 4, 7 and 9F, a second transparent electrode layer (not shown) is formed on the insulating layer 186. Thereafter, the second transparent electrode layer is patterned by the photo etching process to form the second pixel electrode 187, the second connection patterns 153 and 173 and the third and fourth sub connection patterns 176c and 179c. The second pixel electrode 187 overlaps the first pixel electrode 185, and contacts the drain electrode 184 through the seventh contact hole 190. The second connection patterns 153 and 173 make contact with the first connection patterns 152 and 172 through the first contact holes 154 and 174, and make contact with the test lines 141, 142, 161 and 162 through the second contact holes 155 and 175. The third sub connection pattern 176c contacts the first sub connection pattern 177 through the third contact hole 176a, and contacts the first gate connection pattern 172 through the sub contact hole 176b. The fourth sub connection pattern 179c contacts the second sub connection pattern 178 through the fifth contact hole 179b, and contacts the gate line GL through the fourth contact hole 179a.

Referring to FIGS. 4, 7 and 9G, after the second transparent electrode layer is patterned, a test signal is applied to the data and gate test pad electrodes 143a, 144a, 163a and 164a to identify whether the data and gate lines DL and GL have any defects. After testing the data and gate lines DL and GL, an opposite substrate 200 including a color filter CF and a light shielding layer BM is assembled with the display substrate 100. A liquid crystal material 320 is provided between the display substrate 100 and the opposite substrate 200, and a sealing member 310 is used as a seal between the display substrate 100 and the opposite substrate 200. The sealing member 310 may be formed in an area corresponding to the data and gate connection lines 151 and 171.

After a sealing process is performed by the sealing member 310, the mother substrate is cut along the cutting line CL that cross the data and gate connection lines 151 and 171 to separate the display cell area AA from the test area TA.

According to the present example embodiment, the LCD panel, which may is of the PLS mode and includes the display substrate having both the first pixel electrode and the second pixel electrode is formed. The first pixel electrode is formed under the insulating layer, and receives the common voltage through the common voltage line formed on a first insulating layer. In addition, the second pixel electrode formed on the insulating layer is electrically connected to the drain electrode of the switching element, and receives a pixel voltage.

Because the test area is formed on the mother substrate and the display substrate is tested on the test area, the reliability of the display substrate is enhanced. In addition, a connection line is covered and protected by an insulating layer.

The display substrate may be formed by other processes, and is not limited to the method of FIGS. 9A to 9G.

According to the example embodiments of the present disclosure, the opposite substrate facing the display substrate does not include an electrode, and thus a short that may occur in an LCD panel between an electrode of the display substrate and an electrode of the opposite substrate is prevented by having the pixel electrodes both on the same substrate.

Because the test area is formed on the mother substrate and the display substrate is tested on the test area, the reliability of the display substrate is enhanced.

In addition, a connection line is covered by an insulating layer, so that the connection line does not protrude from a cutting section cut along the cutting line crossing the connection line after testing the display substrate, and is not exposed on the cutting section. The connection line makes direct contact with a connection pattern, so that a contact portion of the connection line and the connection pattern is not opened after separating the test area from the display cell area.

The foregoing example embodiments are illustrative and are not to be construed as limiting thereof. Although a few example embodiments have been described, those skilled in the art will readily appreciate that many modifications are possible in the example embodiments without materially departing from the novel teachings and advantages of the present invention. Accordingly, all such modifications are intended to be included within the scope of the present invention. In the claims, means-plus-function clauses are intended to cover the structures described herein as performing the recited function and not only structural equivalents but also equivalent structures. Therefore, it is to be understood that the foregoing is illustrative and is not to be construed as limited to the specific example embodiments disclosed, and that modifications to the disclosed example embodiments, as well as other example embodiments, are intended to be included within the scope of the invention.

What is claimed is:

1. A display substrate comprising:
an insulating substrate;
a plurality of signal lines disposed on the insulating substrate, wherein each signal line includes a pad formed on one end portion of the signal line;
a first pixel electrode electrically connected to each signal line through a switching element;
a second pixel electrode disposed overlapping the first pixel electrode;
a plurality of connection lines, wherein each connection line makes contact with the other end portion of a corresponding signal line and extends in a same direction as the corresponding signal line to an end portion of the insulating substrate, and wherein the end portion of the insulating substrate is disposed adjacent to the other end portion of the corresponding signal line; and
an insulating layer disposed between the first and second pixel electrodes and covering the connection lines,
wherein the display substrate is configured to be cut along a cutting line crossing the connection lines after the display substrate has been tested, and
wherein the connection lines are formed of a different layer than the signal lines.

2. The display substrate of claim 1, wherein the signal lines include a data line extending along a first direction and connected to an input terminal of the switching element.

3. The display substrate of claim 2, wherein each connection line makes direct contact with the other end portion of the corresponding signal line.

4. The display substrate of claim 2, wherein the connection lines are formed of a same material as the first pixel electrode.

5. The display substrate of claim 3, wherein the connection lines are formed of a same material as the first pixel electrode.

6. The display substrate of claim 1, wherein the signal lines include a gate line extending in a direction that crosses the first direction and connected to a control terminal of the switching element.

7. The display substrate of claim 6, wherein the insulating layer has a contact hole exposing the other end portion of the corresponding signal line and the connection line makes contact with the corresponding signal line via the contact hole.

8. The display substrate of claim 7, wherein the connection lines are formed of a same material as the second pixel electrode.

9. The display substrate of claim 6, wherein the connection lines are formed of a same material as the second pixel electrode.

10. The display substrate of claim 1, wherein the connection lines comprise a transparent conductive oxide material.

11. A display substrate comprising:
an insulating substrate;
a gate line disposed on the insulating substrate, the gate line including a gate pad formed on one end portion of the gate line and extending along a first direction;
a data line disposed on the insulating substrate, the data line including a data pad formed on one end portion of the data line and extending along a second direction substantially perpendicular to the first direction;
a thin film transistor including a gate electrode connected to the gate line and a source electrode connected to the data line and a drain electrode;
a first pixel electrode electrically connected to the drain electrode;
a second pixel electrode overlapping the first pixel electrode with an insulating layer interposed between the first pixel electrode and the second pixel electrode;
a first connection line making contact with the other end portion of the data line and extending in a same direction as the data line to a first end portion of the insulating substrate, wherein the first end portion of the insulating substrate extends along the first direction and is disposed adjacent to the other end portion of the data line; and
a second connection line making contact with the other end portion of the gate line and extending in a same direction as the gate line to a second end portion of the insulating substrate, wherein the second end portion of the insulating substrate extends along the second direction and is disposed adjacent to the other end portion of the gate line,
wherein the first connection line is not connected to the second connection line, and
wherein the first connection line is formed of a different layer than the data line, and the second connection line is formed of a different layer than the gate line.

12. The display substrate of claim 11, wherein the first connection line makes direct contact with the other end portion of the data line.

13. The display substrate of claim 12, wherein the first connection line is formed of a same material as the second pixel electrode.

14. The display substrate of claim 13, wherein the second connection line makes contact with the gate line via a contact hole formed through the insulating layer.

15. The display substrate of claim 14, wherein the second connection line is formed of a same material as the first pixel electrode.

16. The display substrate of claim 12, wherein the second connection line makes contact with the gate line via a contact hole formed through the insulating layer.

17. The display substrate of claim 16, wherein the second connection line is formed of a same material as the first pixel electrode.

18. The display substrate of claim 12, wherein the second connection line is formed of a same material as the first pixel electrode.

19. The display substrate of claim 11, wherein the second connection line is formed of a same material as the first pixel electrode.

20. The display substrate of claim 19, wherein the second connection line makes contact with the gate line via a contact hole formed through the insulating layer.

21. The display substrate of claim 20, wherein the first connection line is formed of a same material as the second pixel electrode.

22. The display substrate of claim 19, wherein the first connection line is formed of a same material as the second pixel electrode.

23. The display substrate of claim 11, wherein the second connection line makes contact with the gate line via a contact hole formed through the insulating layer.

24. The display substrate of claim 23, wherein the second connection line is formed of a same material as the first pixel electrode.

25. The display substrate of claim 11, wherein the second connection line is formed of a same material as the first pixel electrode.

26. The display substrate of claim 11, wherein first and second connection lines comprise a transparent conductive oxide material.

* * * * *